June 13, 1967   A. A. BUYDENS   3,325,019
CLIP TRANSFER APPARATUS
Filed June 7, 1965   4 Sheets-Sheet 1

INVENTOR
ALFRED A. BUYDENS
BY Beaman Beaman
ATTORNEY

*INVENTOR*
ALFRED A. BUYDENS
BY Beaman Beaman
ATTORNEY

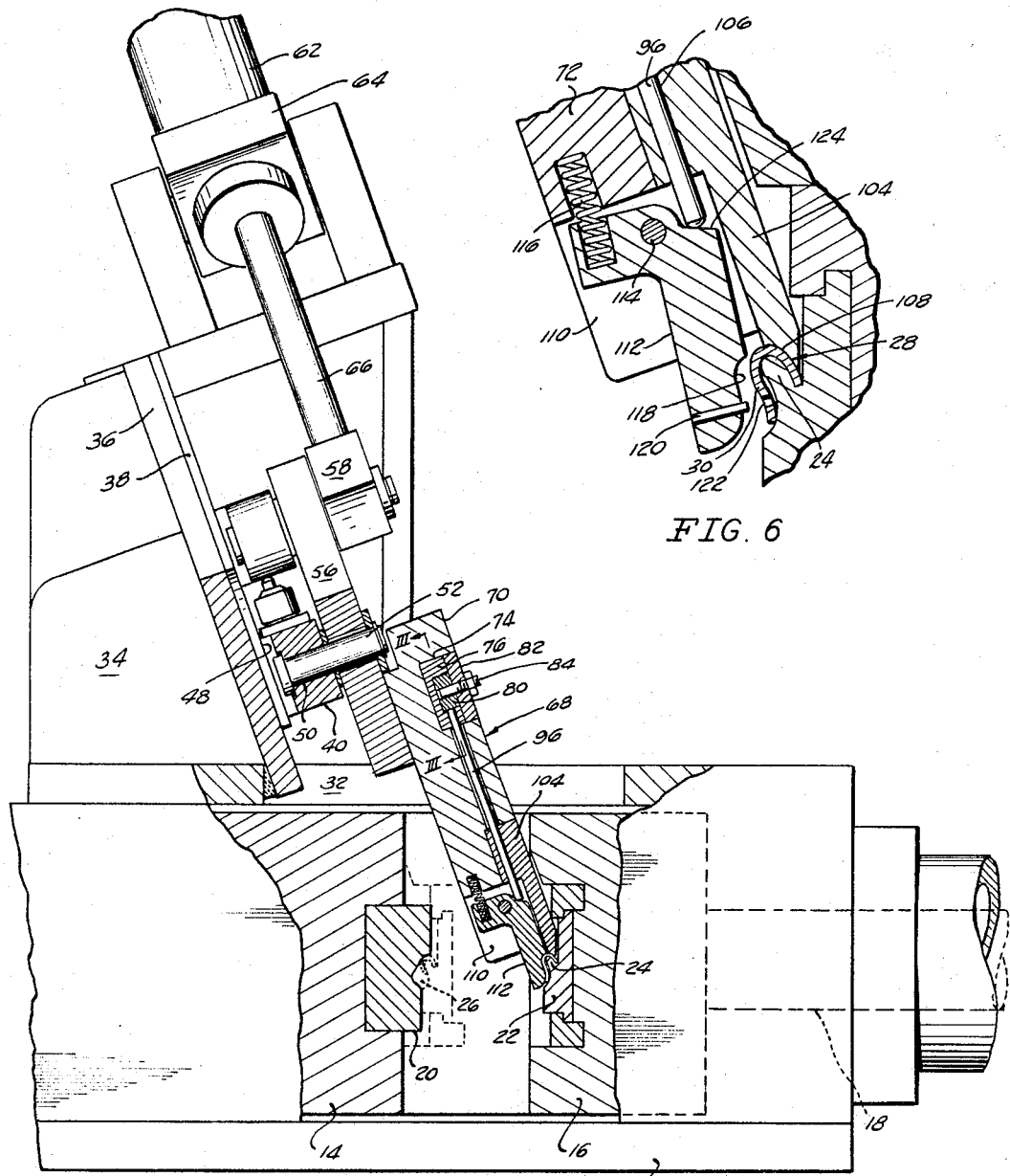

United States Patent Office 3,325,019
Patented June 13, 1967

3,325,019
CLIP TRANSFER APPARATUS
Alfred A. Buydens, Detroit, Mich., assignor to Anchor Bay Manufacturing Company, Inc., Anchorville, Mich., a corporation of Michigan
Filed June 7, 1965, Ser. No. 461,750
3 Claims. (Cl. 214—1)

The invention pertains to article transfer apparatus, and particularly relates to apparatus for loading dies or injection molding apparatus.

In die casting, stamping, or similar operations wherein an insert, bushing, clip or other device is to be placed into a die or mold, transfer apparatus is often employed to load the die or mold with the insert, clip, bushing, etc. The invention is particularly concerned with apparatus for placing a wheel weight retaining clip in an injection molding machine wherein lead is injected into a die cavity defined by a split mold and the retaining clip is molded into the body of wheel weight for permitting the weight to be attached to a wheel rim.

It is, therefore, an object of the invention to provide a clip transfer apparatus which is economical in construction and dependable in operation.

A further object of the invention is to provide an article transfer apparatus wherein the apparatus is capable of transferring an article from a supply source to the interior of an injection molding machine.

Another object of the invention is to provide article transfer apparatus including a transfer head supported by a pair of pivoted links wherein the transfer head, pivoted links, and the support for the links constitutes a parallelogram linkage arrangement wherein a predetermined orientation of the transfer head is maintained during the movement thereof.

A further object of the invention is to provide an article transfer apparatus including an article-holding finger which is automatically actuated during movement of the transfer apparatus. The actuation of the article-holding finger is accomplished by cam means fixed relative to a movable transfer head. The transfer head incorporates movable means adapted to be actuated by the cam means.

Figure 1:
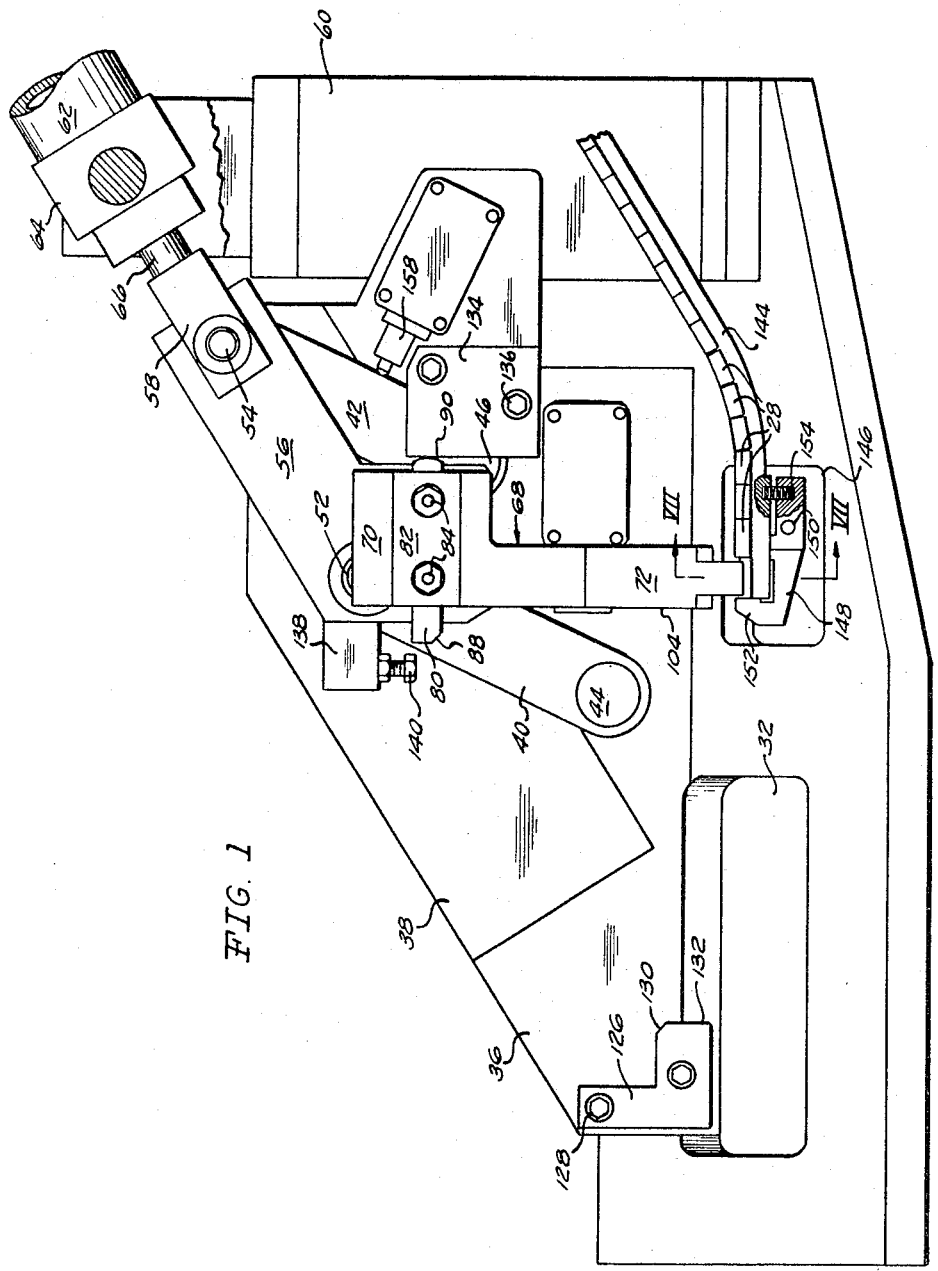
Figure 2:
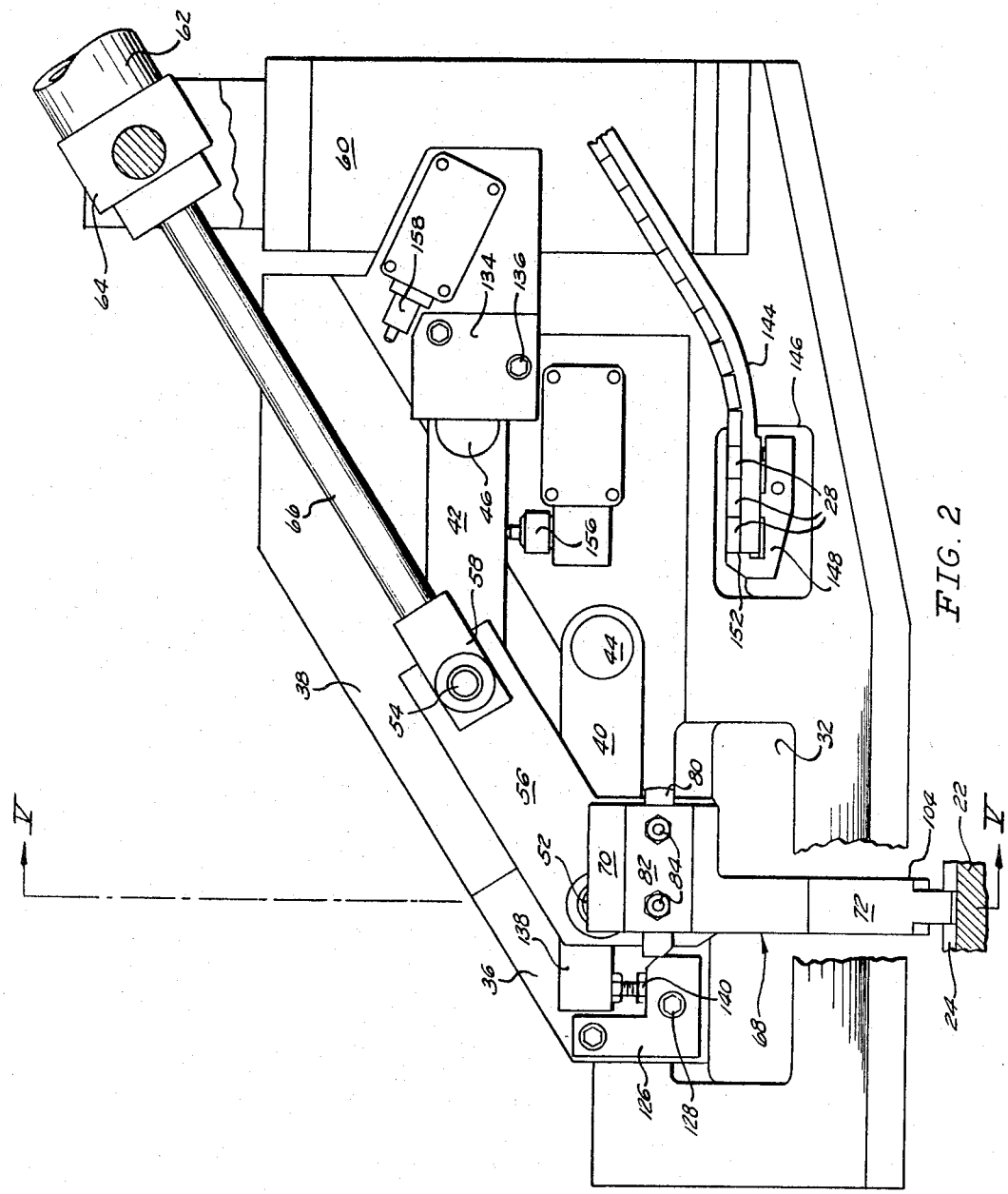
Figure 3:
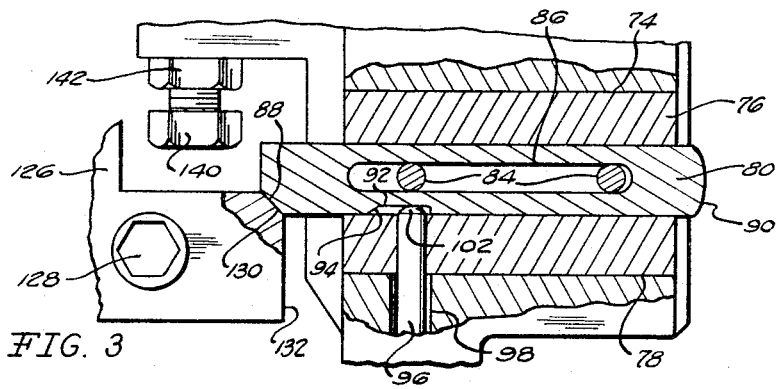

These and other objects of the invention arising from the details and relationships of the components of an embodiment thereof will be apparent from the following description and accompanying drawings wherein:

FIG. 1 is an elevational view of a clip transfer apparatus in accord with the invention illustrating the transfer head in the pickup position, FIG. 2 is a view similar to FIG. 1, however, illustrating the transfer head in the die loading position, a portion of the support member and die apparatus being cut away to illustrate the position of the apparatus within the die, FIG. 3 is an enlarged, elevational, partly sectioned view of the cam and cam-actuated slide, as taken along section III—III of FIG. 5, illustrating the position of the cam slide at the moment of engagement with the cam and prior to movement of the slide.

Figure 4:
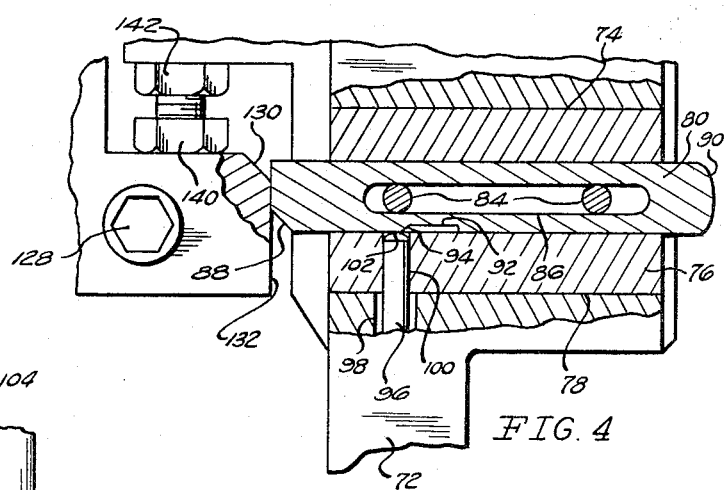

FIG. 4 is a view similar to FIG. 5 illustrating the position of the cam slide after passing over the cam, FIG. 5 is an elevational, sectional view of an article transfer apparatus as taken along section V—V of FIG. 2.

Figure 7:
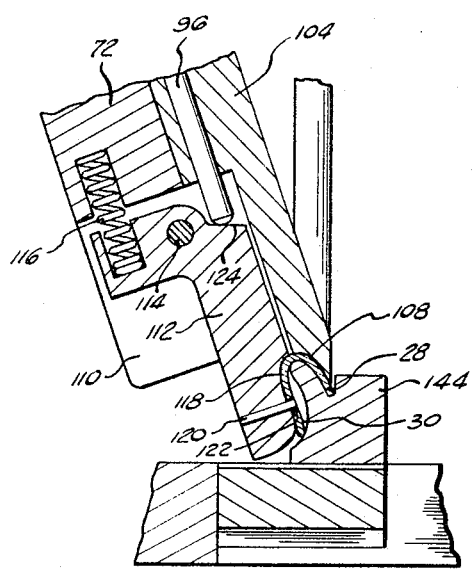

FIG. 6 is an enlarged, detail view of the clip-holding finger upon the finger being open to release the clip, and prior to withdrawal of the transfer head from the die apparatus, and FIG. 7 is an enlarged, detail, elevation, sectional view of the transfer head and finger as taken along section VII—VII of FIG. 1, illustrating the gripping of the clip and prior to removal of the clip from the feed rail.

As best represented in FIGS. 1, 2 and 5, the environment in which the transfer apparatus of the invention is employed will be apparent. An injection-type molding apparatus 10, FIG. 5, is mounted within a housing 12 and includes a stationary die pad 14 and a movable die pad 16, the die pad 16 being slidably mounted within the housing 12 and movable by a piston 18. The die apparatus employs a split mold including a half 20 supported within the stationary pad 14 and a half 22 mounted within the movable pad 16. As the apparatus is described and illustrated as used in conjunction with the manufacture of wheel weights, the die half 22 includes a ledge 24 adapted to support a wheel weight retaining clip 28. This structure can be best appreciated from FIGS. 5 and 6. The ledge 24 projects upwardly and somewhat toward the mold half 20. The mold halves 20 and 22 define a cavity 26 when the molds are disposed adjacent each other in which a portion 30 of a clip supported on the ledge would be disposed. The injection of lead into the mold cavity 26 permits the lead to fill the cavity and encompass the portion 30 of the clip located within the mold cavity to form an effective connection between the clip and wheel weight body. Loading of the clip on the ledge 24 occurs when the die structure is in the full open position shown in full lines in FIG. 5, and such loading is accomplished by means of transfer apparatus having access into the die apparatus and through an opening 32 defined in the housing 12.

The transfer apparatus is mounted upon a support member, generally indicated at 34, which is mounted adjacent, and may be directly affixed to, the molding apparatus 10. The clip transfer apparatus includes a plate 36 preferably, obliquely disposed to the vertical and positioned relative to the casting apparatus opening 32 in a manner as will be apparent from FIG. 5. A wear plate 38 is mounted upon the plate 34 for engagement by the movable components of the transfer apparatus, as will be later apparent.

A pair of links 40 and 42 are pivotally mounted upon the support member 34. Link 40 is pivotally mounted upon a pivot shaft 44, and the link 42 is pivotally supported upon the support member by the pivot shaft 46.

The "free" ends of the links 40 and 42 are provided with a surface 48 which is adapted to engage the wear plate 38 so that the free ends of the links are "supported" by the wear plate. The free, or outer ends, of the links are each also provided with a bore 50, FIG. 5, in which pivot pins 52 and 54 are mounted. A transfer head bracket 56 is pivotally mounted upon the pivot pins 52 and 54 and functions as a link interconnecting the free ends of the links 40 and 42. The spacing between the axes defined by the pins 52 and 54 is identical to the spacing existing between the axes of the pivot shafts 44 and 46. Thus, the support member 34, links 40 and 42, and the transfer head bracket 56, together, constitute a parallelogram linkage. Washers 58 associated with the pivot pins are used in conjunction with locking snap rings to maintain the bracket 56 upon the pivot pins.

The pivot pin 54 is of such length as to permit a piston connection bracket 58 to be pivotally mounted thereon. Adjacent the support member 34 an expandable motor support 60 is defined upon which an expandable motor 62 is mounted for pivotal movement thereto upon a yoke 64. The motor 62 may be either hydraulic or pneumatically operated, and includes a piston 66 terminating in the bracket 58 affixed to the pin 54. Thus, contraction of the piston 66 will position the links 40 and 42 and transfer head bracket 56 as shown in FIG. 1. Extension of the piston 66 will pivot the links and transfer head bracket to the position shown in FIGS. 2 and 5.

A transfer head 68 is affixed to the transfer head bracket 56 by bolts, not shown. The transfer head 68 is of an elongated configuration, having an enlarged upper portion 70 and a lower portion 72 of lesser width than the upper portion. The upper portion 70 is provided with a horizontally disposed recess 74 in which a cam slide guide 76 is mounted. The cam guide 76 is provided with a guideway 78 which slidably receives the cam slide 80. A cover plate 82 is affixed to the transfer head 68 by a pair of threaded studs 84 mounted within the head and extending through the guide 76, cam slide 80 and cover plate 82. The cam slide 80 is provided with an elongated slot 86 through which the studs 84 extend and, thus, the bolts will not interfere with the operation of the cam slide, yet serve to limit longitudinal movement of the cam slide. The cover plate, of course, will maintain the cam slide within the guideway 78.

The cam slide 80 includes an inclined cam surface 88 on the left end thereof, FIGS. 3 and 4, which extends from the transfer head portion 70. An arcuate surface 90 is defined on the other end of the cam slide. Within the transfer head portion, the cam slide is provided on its lower edge with a recess 92 extending in the longitudinal direction of the cam slide, and having an inclined cam surface 94 defined at one end thereof.

A finger-actuating rod 96 is slidably mounted within the transfer head in a bore 98 defined therein, FIGS. 3, 4 and 5, and the upper end of the rod 96 slidably extends through a bore 100 defined in the cam slide guideway 78. The upper end 102 of the rod 96 is rounded, FIGS. 3, 4 and 5, and is adapted to be selectively received within the cam slide recess 92.

The lower end of the transfer head portion 72 is provided with a hardened insert 104, also having a bore 106 defined therein for slidably receiving the rod 96. The lower end of the insert 104 is provided with a concave surface 108, FIG. 6, adapted to closely conform to the configuration of a portion of the wheel weight clip 28.

The transfer head lower portion 72 also includes a slot 110 in which a finger 112 is pivotally mounted upon a pivot pin 114. A spring 116 interposed between the finger 112 and the transfer head 68 biases the shaped surface portion 118 of the finger 112 toward the insert surface 108. The shaped portion 118 of the finger conforms to the configuration of the wheel weight retaining clip 28 and includes a locating stud 120 adapted to cooperate with a hole 122 defined in the wheel weight clip portion 30.

The finger 112 is provided with a shoulder 124 adapted to be engaged by the lower end of the rod 96, and the shoulder 124 is so located that movement of the rod 96 toward the finger 112 pivots the finger contoured portion 118 away from the insert 104, compressing the spring 116.

A cam bracket 126 is affixed to the support member 34 adjacent the die casting apparatus to actuate the finger 112 when the transfer head 68 is within the die casting molds and has positioned the clip upon the ledge 24. The cam bracket 126 is affixed to the support member 34 by bolts 128 and includes an inclined cam surface 130 and a vertically disposed cam surface 132. The cam surface 130 is so positioned that when the cam slide 80 is moved to the left as shown in FIG. 3, the cam slide cam surface 88 will engage the cam surface 130 when the transfer head is moving from the position of FIG. 1 to that of FIG. 2.

A cam slide abutment 134 is mounted upon the support member by bolts 136 and is adapted to engage the right end 90 of the cam slide 80 when the wheel weight retaining slip is being "picked up" and, thus, engagement of the abutment 134 and the cam slide surface 90, as shown in FIG. 1, will shift the cam slide 80 to the left during each cycle of operation.

A stop bracket 138 is attached to the transfer head bracket 56 and includes a stop screw 140 threaded into a threaded hole which is locked therein by the lock nut 142. The screw 140 will engage the cam bracket 126 to position the final movement of the transfer head to locate the clip 28 upon the ledge 24.

The wheel weight retaining clips are supplied to the transfer head via a rail 144 which may be connected to any conventional type of article feeding device such as those of the vibrating type.

The rail 144 is supported at its lower end by a bracket 146 mounted upon the support member and a lever 148 pivotally mounted upon the bracket 146 at 150 includes a portion having a shoulder 152 adapted to engage the end of the rail 144 and serve as an abutment to limit the downward movement of the clips 28 upon the rail. A spring 154 is interposed between the rail 144 and the lever 148 biasing the lever in clockwise direction as to normally maintain the shoulder 152 in engagement with the end of the rail.

As the operating mechanism for the motor 62 does not constitute a part of the invention, it is not shown in detail. However, the various limit switches, as represented at 156 and 158, are illustrated as being mounted upon the support member 34 for sensing the extremes of movement of the transfer head. The limit switches are connected to suitable control means which in turn operate the sequence mechanism for the motor 62 and the die casting apparatus.

In operation, the apparatus will begin its cycle in the position shown in FIG. 1. The piston 66 is fully retracted and, thus, moves the transfer head mechanism to its rightmost position. In this position the abutment 134 will engage the surface 90 of the cam slide 80 and bias the cam slide to the left wherein the cam slide will be substantially projecting beyond the confines of the transfer head portion 70. In this "loading" or "pickup" position, the insert 104 and finger 112 will be located as to be centrally related to the wheel weight clip 28 in engagement with the shoulder 152. As the cam slide 80 will be in its leftmost position, as shown in FIG. 3, the upper end 102 of the rod 96 will be received within the cam slide recess 92, permitting the finger 112 to be biased by the spring 116 to the position shown in FIG. 7. In this position the wheel weight clip 28 will be firmly gripped between the finger 112 and the insert 104 in the respective conforming surfaces defined on these components. Also, the locating stud 120 will be received within the hole 122 defined in the wheel weight clip.

It will be noted that in the position shown in FIG. 1 the links 40 and 42 have passed to the right "beyond" center of the pivot shafts 44 and 46, respectively. Thus, upon extension of the pinion rod 66, movement of the transfer head 68 to the left also causes the transfer head to rise vertically and, thus, lift the wheel weight clip 28 from the rail 144. Any tendency for the shoulder 152 to interfere with the removal of the wheel weight clip from the rail is overcome by the ability of the lever 148 to pivot counterclockwise against the spring 154 and, thus, the wheel weight clip may be readily moved from the rail.

As the transfer head 68 approaches the die casting apparatus and the cam bracket 126, the wheel weight clip 28 will be firmly retained within the transfer head by the spring 116, conforming surfaces of the insert 104 and finger 112, and the stud 120.

As the stop screw 140 approaches the cam bracket 126, the cam slide surface 88 will engage the bracket cam surface 130, as shown in FIG. 3. The continued downward movement of the transfer head relative to the cam bracket 126 causes the cam surface 130 to move the cam slide 80 to the right. Such movement of the cam slide will cause the recess cam surface 94 to pass over the end 102 of the rod 96 and push the rod 96 downwardly. As soon as the cam 94 passes over the rod and moves the rod downwardly, the finger 112 will be moved to the "open" or release position shown in FIG. 6. Thus, the finger 112 will be withdrawn from the wheel weight retaining clip 28 and the locating stud 120 will be withdrawn from the clip hole 122.

Of course, the release of the wheel weight clip 28 will not occur until the clip has been located upon the die ledge 24 and release of the wheel weight 28 by the transfer head will not occur until the wheel weight clip is positioned within the die as required. The engagement of the left end of the cam slide with the cam bracket surface 132 will maintain the cam slide 80 in the position which assures that the finger 112 will be maintained in the release position during this sequence of the transfer apparatus operation.

Loading of the die casting apparatus will be sensed by the limit switch 156 which, through suitable circuits, will actuate the motor 62 to retract the piston 66 and move the transfer apparatus back to the position shown in FIG. 1. Such movement of the transfer apparatus will cause no interference between the insert 104 or finger 112 with the clip positioning lever 148, in that should these components engage, the lever will be pivoted downwardly out of the way, and once again permit proper alignment of the transfer apparatus with the wheel weight clip adjacent the shoulder 152.

While the transfer apparatus is returning to the position of FIG. 1 and "picking up" the next wheel weight clip, the die casting structure will be operating to close the dies and lead will be injected into the mold cavity 26 to form a wheel weight. After the molding operation has taken place, the die components will open to the position shown in full lines in FIG. 5 and be ready to receive the next wheel weight clip.

It will, therefore, be appreciated that the article transfer apparatus of the invention is of a simple, yet dependable and economical construction capable of quickly automatically loading a wheel weight casting machine with the retaining clip.

It is appreciated that various modifications to the disclosed embodiment may be apparent to those skilled in the art without departing from the spirit and scope thereof, and it is intended that the invention be defined only by the scope of the following claims.

I claim:
1. Die loading apparatus comprising, in combination,
   (a) a support member,
   (b) a pair of linkages having outer ends and inner ends, said inner ends being pivotally mounted upon said support member,
   (c) a bearing and support plate mounted on said support member underneath said linkages outer ends and obliquely related to the vertical, said plate being parallel to the intended plane of movement of said linkages,
   (d) means defined on said linkages outer ends engaging said plate for sliding movement thereon wherein said plate guides the movement of said linkages and determines the plane of movement thereof,
   (e) a transfer head pivotally mounted on said linkages, the pivotal connection of said linkages to said support member and said transfer head on said linkages being so located that said support member, linkages and transfer head define a parallelogram linkage,
   (f) a pickup station located adjacent said support member,
   (g) a die spaced from said pickup station, and
   (h) motor means drivingly associated with said transfer head adapted to move said head from a first position adjacent said pickup station to a second position adjacent said die.

2. Die loading apparatus comprising, in combination,
   (a) a support member,
   (b) a pair of linkages pivotally mounted upon said support member,
   (c) a transfer head pivotally mounted on said linkages, the pivotal connections of said linkages to said support member and said transfer head on said linkages being so located that said support member, linkages and transfer head define a parallelogram linkage,
   (d) a spring biased article-holding finger pivotally mounted on said transfer head, said finger being biased toward an article-holding position,
   (e) a slide movably mounted on said transfer head having a cam surface defined thereon,
   (f) finger actuating means mounted on said transfer head adapted to engage said cam surface and connected to said finger whereby movement of said slide and cam surface operates said finger to pivot said finger to an article-releasing position,
   (g) a pickup station located adjacent said support member adapted to dispense the article to be loaded into a die,
   (h) a die spaced from said pickup station,
   (i) motor means drivingly associated with said transfer head adapted to move said head from a first position adjacent said pickup station to a second position adjacent said die,
   (j) a cam mounted on said support member adjacent said die adapted to engage said slide as said head approaches said die and shift said slide to actuate said finger to an article-releasing position, and
   (k) slide reset means mounted on said support member adjacent said pickup position adapted to engage said slide as said transfer head approaches said pickup position to shift said slide to disengage said finger actuating means from said cam surface to permit said finger to be biased to an article-holding position.

3. Die loading apparatus comprising, in combination,
   (a) a support member,
   (b) a pair of linkages pivotally mounted upon said support member,
   (c) a transfer head pivotally mounted on said linkages, the pivotal connections of said linkages to said support member and said transfer head on said linkages being so located that said support member, linkages and transfer head define a parallelogram linkage,
   (d) an article-holding finger pivotally mounted on said transfer head,
   (e) a slide movably mounted on said transfer head,
   (f) means connecting said slide to said finger whereby movement of said slide operates said finger,
   (g) a pickup station located adjacent said support member adapted to dispense the article to be loaded into a die,
   (h) a die spaced from said pickup station,
   (i) motor means drivingly associated with said transfer head adapted to move said head from a first position adjacent said pickup station to a second position adjacent said die,
   (j) a cam mounted on said support member adjacent said die adapted to engage said slide and shift said slide to actuate said finger to an article-releasing position,
   (k) slide reset means mounted on said support member adjacent said pickup position adapted to shift said slide to actuate said finger to an article-holding position, and
   (l) pivotally mounted article abutment means defined at said pickup station whereby said abutment means can be pivotally displaced from interfering with said transfer head.

References Cited
UNITED STATES PATENTS

| | | | |
|---|---|---|---|
| 1,843,285 | 2/1932 | Ingle | 214—147 |
| 2,811,266 | 10/1957 | Udal | 214—147 |
| 2,948,417 | 8/1960 | Haanes | 214—1 |
| 2,976,595 | 3/1961 | Cook et al. | 25—43 |

GERALD M. FORLENZA, *Primary Examiner.*

MARVIN A. CHAMPION, *Examiner.*